United States Patent

Chakraverty et al.

[15] 3,679,947

[45] July 25, 1972

[54] METAL-INSULATOR SEMI-CONDUCTOR STRUCTURES WITH THERMALLY REVERSIBLE MEMORY

[72] Inventors: Benoy Kumar Chakraverty, Varces; Alain Plenier, Grenoble, both of France

[73] Assignee: Agence Nationale De Valorisation De La Rechercke (Anvar), Paris, France

[22] Filed: Feb. 10, 1971

[21] Appl. No.: 114,154

[30] Foreign Application Priority Data

July 10, 1970 France ........................7025759

[52] U.S. Cl. ...................317/234 R, 317/234 V, 317/234 F, 317/234 S, 317/235 K, 317/235 AC, 317/235 AY, 317/235 AQ

[51] Int. Cl. ....................................H01l 9/00

[58] Field of Search ............317/234 V, 234 F, 234 S, 235 K, 317/235 AC, 235 AY, 235 AQ; 338/25

[56] References Cited

UNITED STATES PATENTS

| | | | |
|---|---|---|---|
| 3,502,953 | 3/1970 | Aronson | 317/238 |
| 3,550,155 | 11/1970 | De Rosa | 346/74 |
| 3,343,004 | 9/1967 | Ovshinsky | 307/88.5 |
| 3,564,353 | 2/1971 | Corak | 317/234 |

*Primary Examiner*—Martin H. Edlow
*Attorney*—Cameron, Kerkam & Sutton

[57] ABSTRACT

A metal-insulator semiconductor structure for use in particular as a switching element with thermally reversible memory and comprising a semiconductor substrate, a film of amorphous insulator material on the said substrate and a metallic film which is deposited at least partially on the said insulator film, characterized in that the said amorphous insulator film exhibits a resistivity which is lower than the intrinsic resistivity of the said amorphous insulator material and which is comprised between $10^7$ and $10^{11}\Omega$-cm at ambient temperature, the decrease in the said resistivity being due to the diffusion of ions into the said amorphous insulator film, the said structure being in a conducting or insulating stage within a predetermined temperature range, in an insulating state above the said range and in a conducting state below the said range.

6 Claims, 5 Drawing Figures

METHOD INSULATOR SEMI-CONDUCTOR STRUCTURES WITH THERMALLY REVERSIBLE MEMORY

This invention is concerned with improvements to metal-insulator-semiconductor structures which are mainly composed of a semiconducting substrate, a film of amorphous insulator material which is deposited on said substrate and a metallic film which is deposited at least partially on said insulator film. The invention makes it possible in particular to employ these structures as switching elements with thermally reversible storage or memory.

Switching phenomena have already been exhibited by metal-insulator-semiconductor structures (designated hereinafter as MIS structures). This effect is represented graphically by the curve of FIG. 1 which shows by way of example the variations in intensity I of the electric current which flows through an MIS structure as a function of the bias voltage V which is applied between the metal and the semiconductor, the insulator being formed of amorphous silica having very high resistivity, namely approximately $10^{18}\Omega$-cm at room temperature. It is found that, when the bias voltage is increased progressively from zero voltage ($V = 0$), the current intensity I is very low until a threshold bias voltage $V_S$ is attained: within this interval, the MIS structure can be considered as non-conducting. In the case of a bias voltage which is equal to the threshold value $V_S$, there is observed a very rapid increase in the current intensity I accompanied by a drop in the bias voltage V: this latter becomes conductive and it is observed that its resistance is low as it passes through a state of negative resistance. The threshold voltage $V_S$ is substantially lower than the breakdown voltage of the insulator of the structure. This transition from an insulating state to a conducting state is a threshold switching effect, the threshold being the threshold bias voltage $V_S$. Modification of the temperature of the structure results in a variation in the value of the threshold voltage $V_S$ but the shape of the curve of FIG. 1 is not modified.

The present invention proposes an MIS structure and a method of fabrication of said structure which meet practical requirements more effectively than those of the prior art, particularly by virtue of the fact that it thus becomes possible to obtain a switching effect with thermally reversible memory.

To this end, the invention proposes a metal-insulator-semiconductor structure for use in particular as a switching element with thermally reversible memory and comprising a semiconductor substrate, a film of amorphous insulator material which is deposited on said substrate and a metallic film which is deposited at least partially on said insulator film. Said amorphous insulator film essentially exhibits a resistivity which is lower than the intrinsic resistivity of said amorphous insulator material and which is comprised between $10^7$ and $10^{11}\Omega$-cm at ambient temperature, the decrease in said resistivity being due to the diffusion of ions within said amorphous insulator film, said structure being in a conducting or insulating state within a predetermined temperature range, in an insulating state above said range and in a conducting state below said range.

The invention is also concerned with a method of fabrication of a metal-insulator-semiconductor structure for use as a switching element with thermally reversible memory and comprising a semiconductor substrate, a film of amorphous insulator material which is deposited on said substrate and a metallic film which is deposited at least partially on said insulator film. Said method essentially consists in doping said amorphous insulator film in order to reduce the resistivity of said insulator film to a value between $10^7$ and $10^{11}\Omega$-cm at ambient temperature, said structure being accordingly in a conducting or insulating state within a predetermined temperature range, in an insulating state above said range and in a conducting state below said range.

The invention also proposes a device for switching with thermally reversible memory, characterized in that said device comprises at least one metal-insulator-semiconductor structure as hereinabove described and means for producing within the said insulator film of each structure temperatures which are located both inside and outside said temperature range.

A better understanding of the invention will be gained from the following description of one embodiment of the invention which is given by way of non-limitative example, reference being made to the accompanying drawings, in which.

Figure 2:
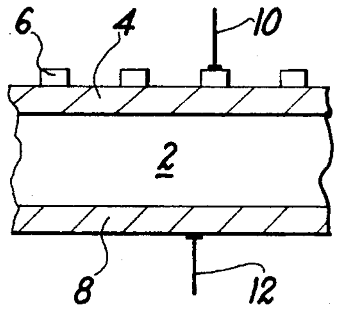
FIG. 2 shows an MIS structure.

As shown in FIG. 2, an MIS structure in accordance with the invention is made up of a semiconductor substrate 2 in a thin layer having a thickness of approximately 200 $\mu$. The semiconductor can be silicon of either the $P^+$ or $N^+$ type. A film of amorphous insulator material 4 is deposited on said substrate and can be, for example, selenium, silica, titanium oxide, zirconium oxide, nickel oxide, niobium oxide, boron, or alternatively compounds having a base of semiconducting material. The insulator which is chosen must be amorphous: in other words, no diffraction pattern must be observed when this material is examined under an electron microscope. When the insulator is amorphous silica, the film 4 can then be formed by oxidizing the substrate 2. The thickness of the oxide film is approximately 1,000 A. A metallic film 6 which partly covers the film 4 is then deposited by evaporation in vacuum. By way of example, the metal employed for this purpose can be either gold or aluminum. When the substrate has high resistivity, it can be an advantage to deposit a metallic film 8 on the substrate by evaporation so as to obtain a good ohmic contact on the rear face of the structure. The film just mentioned can be of gold or antimony, for example. The thicknesses of the metallic films 6 and 8 are equal to 0.5 $\mu$, for example. Electrical contacts 10 and 12 are welded to the metallic films 6 and 8 respectively. The resistivity of the film 4 of amorphous insulator material is usually high, namely in the vicinity of $10^{18}\Omega$-cm at room temperature. In accordance with the present invention, the resistivity of said film is reduced to a value between $10^7$ and $10^{11}\Omega$-cm at room temperature by doping the film of amorphous insulator material with metallic ions. Doping can be accomplished in a number of different ways. There can first be carried out a conventional operation which consists in diffusion of the metallic ions by ion implantation, for example. This operation is preferably carried out prior to deposition of the metallic film 6 on the insulator film. It is also possible to effect the breakdown of the insulator of the MIS structure by applying between the terminals 10 and 12 a bias voltage which is higher than the breakdown voltage $V_B$. Diffusion of the metallic ions of the film 6 into the insulator film 4 then takes place. It is also possible to heat the MIS structure to a temperature of approximately 800° C for a period of 24 hours, with the result that part of the metal of the film 4 is diffused into the insulator. The two last-mentioned operations of breakdown of the insulator and heating can be combined. In all cases, doping of the amorphous insulator film 4 is achieved as an end result. Within a predetermined temperature range, the MIS structure then changes over from an initially insulating state to a conducting state.

Figure 1:
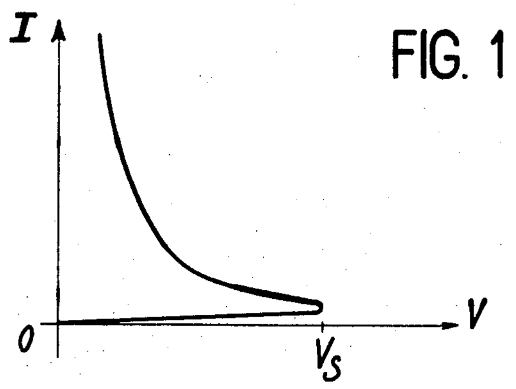
FIG. 1 shows the current-voltage characteristics of an MIS structure of the prior art.
Figure 3:
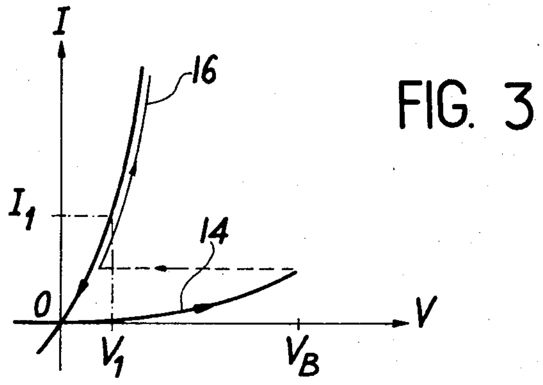
FIG. 3 shows the current-voltage characteristics of an MIS structure before and after breakdown of the insulator.

This transition from an insulating state to a conducting state is shown by the curves 14 and 16 of FIG. 3 which represents the variations in intensity I of the current which flows through the MIS structure as a function of the value V of the bias voltage which is applied between the two terminals 10 and 12. Curve 14 shows the insulating state and curve 16 shows the conducting state. When the bias voltage V is increased progressively from zero (curve 14), the current intensity I is very low up to the breakdown voltage $V_B$. At this last-mentioned value, there is a transition from curve 14 to curve 16, the current increases very rapidly and there is a drop in the terminal voltage of the MIS structure. The transition from the insulating state to the conducting state could only be achieved by doping of the amorphous insulator film 4, in this case as a result of breakdown of the insulator. The curves 14 and 16 of FIG. 3 are symmetrical with respect to the origin O. The breakdown voltage $V_B$ decreases when the temperature of the MIS structure increases. The cycle which is represented in FIG. 3 by the curves 14 and 16 can be repeated a large number of times. A memory switching phenomenon is therefore found to exist, the memory or storage effect being the conducting and insulating states. It can be noted that the curve of FIG. 1 which represents the prior art can also be obtained by means of an MIS structure in which the insulator film has been doped but under very special conditions of observation which depend on the value of the resistance which is placed in series with the generator whose function is to supply the bias voltage to the terminals of the MIS structure.

Figure 4:
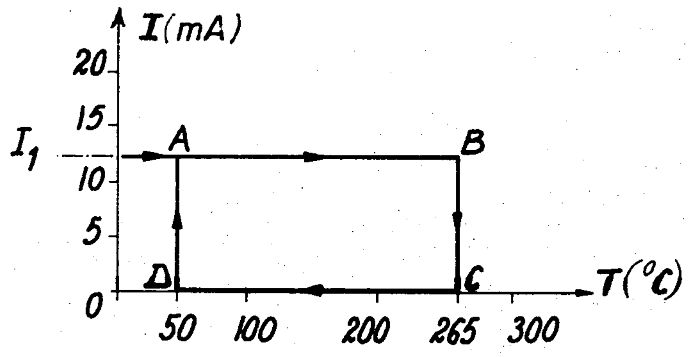
FIGS. 4 and 5 show the variations in current which flows through an MIS structure in accordance with the invention as a function of the temperature of said structure, the bias voltage being constant.
Figure 5:
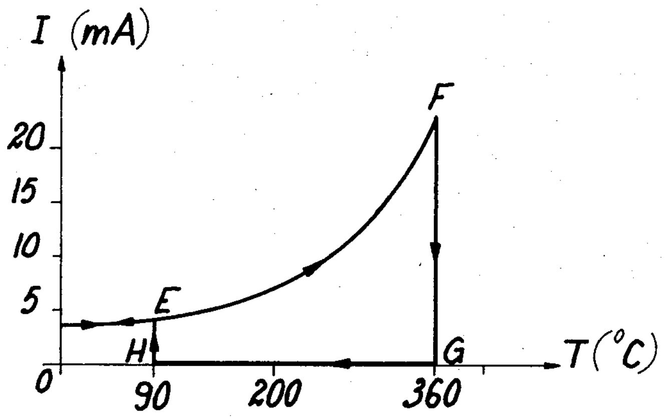

Assuming that the conditions of voltage and current are as represented by the curve 16 of FIG. 3, for example at the point of coordinates ($I_1$, $V_1$) at which the MIS structure is in a conducting state, and that the temperature of the MIS structure is increased from room temperature, the cycles shown in FIG. 4 and 5 are accordingly carried out. These cycles have been obtained by means of an MIS structure in which the insulator is amorphous silica. In the case of the cycle shown in FIG. 4, the structure can initially be in the conducting state, for example, while the value of the current is $I_1$. When the temperature of the MIS structure is increased, said structure remains in a conducting state up to a temperature of approximately 265° C (portion AB of the cycle). At this temperature (point B), the structure changes over from a conducting state to an insulating state (portion BC of the cycle): the value of intensity I of the current changes abruptly from $I_1$ to a practically zero value. If the temperature is increased further, the structure remains in an insulating state. The same applies when the temperature is reduced to approximately 50° C (portion CD of the cycle). At the value last mentioned (at point D), the MIS structure changes abruptly from an insulating state to a conducting state (portion DA of the cycle): the electric current varies very rapidly from a practically zero value to a value which is substantially equal to $I_1$. In consequence, a switching element with thermally reversible memory is in fact obtained. The structure is conducting up to 50° C and insulating above 265° C. Within the temperature range (50° C, 265° C), the structure is either conducting or insulating according as its initial temperature state is lower than 50° C or higher than 265° C.

The variation in current I as a function of the temperature can also have the form represented by the cycle of FIG. 5. At the outset, the sample is in a conducting state; when the temperature is increased, the sample remains conductive but the current increases up to a temperature in the vicinity of 360° C (portion EF of the cycle). At this temperature (point F), the current changes abruptly from a value which is higher than 20 mA to a practically zero value (portion FG of the cycle); the MIS structure is then insulating and remains in this condition when the temperature is reduced to approximately 90° C (portion GH of the cycle). At this temperature (point H), the system changes over from the insulating state to the conducting state (portion HE of the cycle).

In the insulating state, conduction is electronic. Switching to the conducting state can be explained by precipitation of a metallic phase or by an increase in concentration of impurities which results in changeover to a conduction by a band of impurities of metallic type.

This phenomenon of switching with thermally reversible memory has a number of applications. In particular, the memory can either be written or erased (insulating state or conducting state) by localized heating. For example, it is possible to construct an assembly of memories comprising a mosaic of MIS structures in accordance with the invention as associated with means for varying the temperature of the MIS structures independently of each other. For example, said means can be a focused laser beam which can be caused to sweep the entire surface of the mosaic. Many thermooptical applications can also be contemplated since there is a change in reflectivity of the amorphous insulator film with temperature, this change being due to the variation in the number of free electrons which are present in the insulator film.

Finally, it must be understood that values of temperatures and current intensities have been given in the foregoing solely by way of example.

What we claim is:

1. A metal-insulator-semiconductor structure for use in particular as a switching element with thermally reversible memory and comprising a semiconductor substrate, a film of amorphous insulator material selected from the group consisting of selenium, silica, titanium oxide, zirconium oxide, boron, nickel oxide, compounds having a base of semiconductors and niobium oxide on the said substrate and a metallic film which is deposited at least partially on the said insulator film, said amorphous insulator film exhibiting a resistivity which is lower than the intrinsic resistivity of the said amorphous insulator material and which is comprised between $10^7$ and $10^{11}\Omega$-cm at ambient temperature, the decrease in the said resistivity being due to the diffusion of metallic ions of said metallic film into the said amorphous insulator film, the said structure being in a conducting or insulating state within a temperature range, in an insulating state above the said range and in a conducting state below the said range.

2. A metal-insulator-semiconductor structure in accordance with claim 1, said substrate being silicon.

3. A metal-insulator-semiconductor structure in accordance with claim 1, wherein said metal being gold.

4. A metal-insulator-semiconductor structure, in accordance with claim 1 wherein said semiconductor substrate includes a metallic electrode for applying a bias to said structure.

5. A switching device with thermally reversible memory, comprising at least one metal-insulator-semiconductor as defined in claim 1 and means for producing within the insulator film of said amorphous material temperatures selectively causing said structure to be in an insulating state and in a conducting state.

6. A switching device in accordance with claim 5, said means being a laser beam.

* * * * *